UNITED STATES PATENT OFFICE.

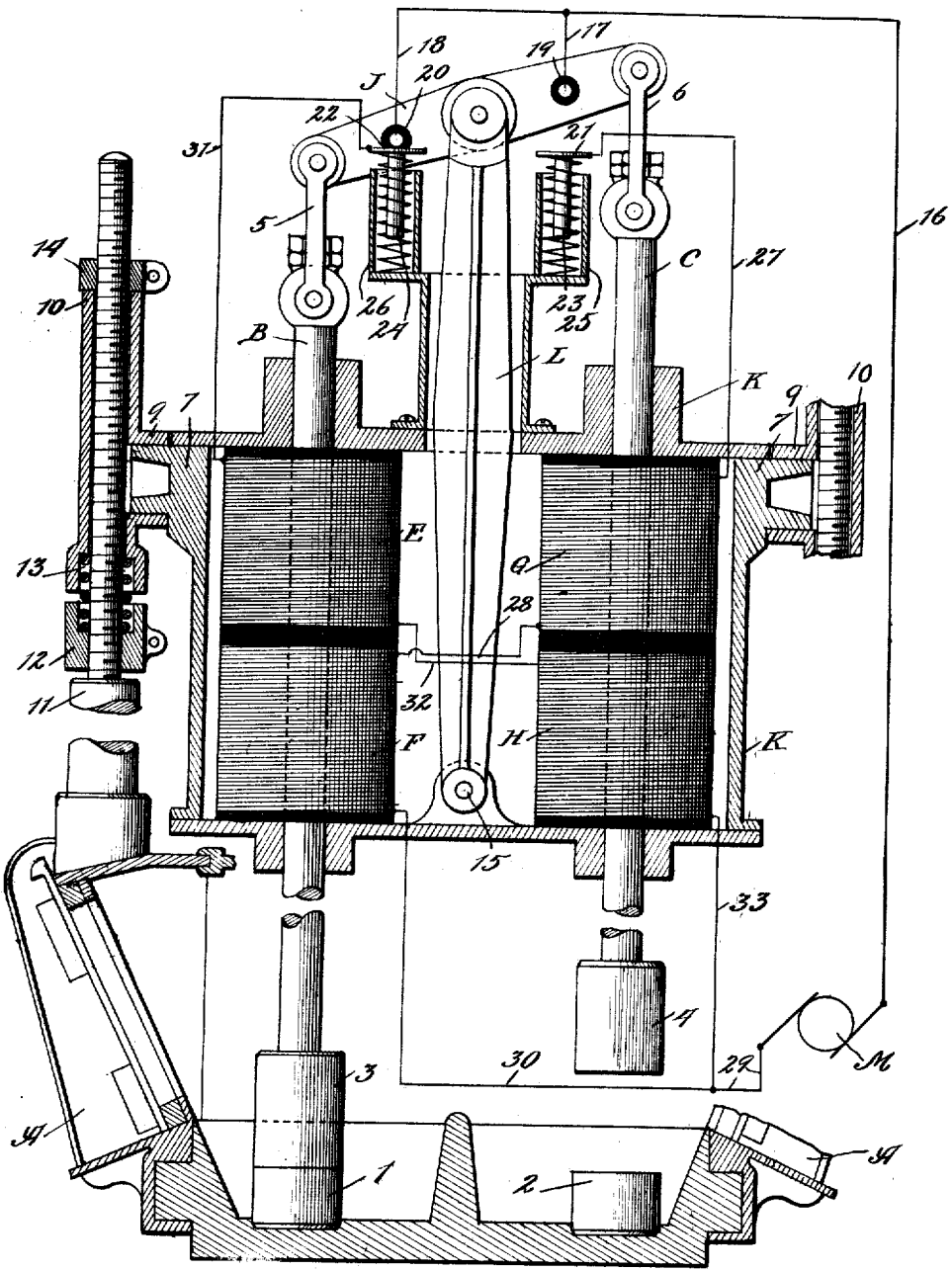

CHARLES W. TREMAIN, OF CHICAGO, ILLINOIS.

RECIPROCATING ELECTRIC MOTOR.

No. 920,222.　　　　Specification of Letters Patent.　　　Patented May 4, 1909.

Application filed April 14, 1908. Serial No. 426,943.

*To all whom it may concern:*

Be it known that I, CHARLES W. TREMAIN, a citizen of the United States, residing at Chicago, in the county of Cook and State of Illinois, have invented certain new and useful Improvements in Reciprocating Electric Motors, of which the following is a specification.

My invention relates to a reciprocating electric motor and has for its object to provide a reciprocating electric motor which shall be suitable for use as a drill or a stamp, or in other connections, and which shall have two reciprocating armatures coupled together so as to work simultaneously in opposite directions.

There are several advantages in constructing an electro-magnetic drill, stamp or the like with two armatures coupled so as to work together. For example, one armature and the tool which it carries or operates is thus balanced against the other armature and tool, so that the starting inertia at the beginning of each reciprocation is decreased and the force of the blows capable of being better regulated than in the case of a single armature. Again, the use of two armatures or cores with their corresponding magnets increases the power of the motor. Furthermore, the movement in opposite directions of the cores or the tilting movement of the coupling lever may be utilized for shifting the currents which produce the magnetic pulls in opposite directions. But in stamps or drills, and in other devices of this character, the length of stroke of the tool carrying part will, under practical working conditions, differ considerably. For example, in a stamp, the length of the down stroke will vary according to the hardness or the amount of the material under the shoe. This circumstance interferes with a rigid coupling together of the armatures of a duplex electro-magnetic engine used as a stamp or the like; and particularly where the shifting of the currents from the coils producing the down stroke to those producing the up-stroke, and vice versa, is to be effected by the movements of the cores, or some parts associated therewith.

One of the principal objects of my present invention is to so couple the armatures of a duplex reciprocating electric motor that they will work together but without the shortening of the stroke of one of the armatures limiting the stroke of the other armature. This I accomplish by providing the lever, or other connecting means between the armatures, with a shifting fulcrum or other connection with the body of the machine.

My invention has for further objects such new and improved constructions, devices and arrangements in reciprocating electric motors, and particularly in such motors used as stamps, drills or the like, which will be described in the following specification and particularly set forth in the claims appended thereto.

The invention, in one of its illustrative embodiments, is shown in the accompanying drawing, which shows in vertical section an electro-magnetic stamp having two shoe carrying armatures coupled together by a lever with a shifting fulcrum.

A is the battery of a stamp mill having two dies 1 and 2.

B and C represent the cores of a duplex electro-magnet which, as shown, consists of the coils E, F, G and H. Any number of coils might be used for each magnet. The cores B and C carry at their lower extremities the shoes 3 and 4, respectively, and their upper ends are connected with a lever J by means of links 5 and 6, respectively.

The cores and coils are mounted in a casing K which may be supported in any desired manner on the battery of the stamp. Preferably I provide means by which the position of this case may be adjusted vertically and may be supported elastically; the latter provision resulting in a machine which works more smoothly and lasts longer than if the cores and coils were rigidly connected with the apparatus. To this end, I form the casing with the trunnions 7, which extend into sockets 9 formed upon sleeves 10 around the vertical supports 11. These arrangements are illustrated on the left side of the drawing. They will, of course, be duplicated at the other side of the machine. The support 11 as shown is screw threaded to receive an adjusting nut 12. The adjusting nut and the sleeve 10 are chambered so as to form seats for a spiral spring 13. Nut 14 above the sleeve holds the same in position. The swinging of the casing on the trunnions allows a slight shifting of the whole tool-carrying apparatus when the material under one or other of the shoes is uneven in quality. By giving the apparatus this little side play destructive jars and strains are avoided

The lever J is fulcrumed on a vertical beam L which is pivoted at 15 to the casing K. The shifting of the fulcrum of J might be effected in numerous other ways. By giving J a shifting fulcrum, of one sort or another, it will be seen that if the down stroke, for example, of one of the cores be shortened by an obstruction between its shoe and corresponding part, the other core will nevertheless complete its up stroke. Thus, the force of the down stroke of the other core will not be lessened by a shortening of the stroke of its companion, nor the shifting of the currents when this is made dependent upon the completion of the up strokes of the cores.

Each magnet may consist of one or more coils. Preferably I provide two coils for each core and connect the coils so that the upper and lower coils of each magnet are on the same circuit. In the drawing, M represents the generator, one of the main leads 16 of which has the branches 17 and 18 which connect with the contacts 19 and 20, respectively, on the lever J, but insulated therefrom. These contacts come against the contact buttons 21 and 22, respectively, which are supported by springs 23, 24 in spring cases 25, 26, respectively. From button 21 a conductor 27 leads to coil G, coil G is connected with coil F by conductor 28, coil F with the other lead 29 of the generator M by conductor 30. Conductor 31 leads from the button 22 to coil E, conductor 32 from coil E to coil H, and conductor 33 from coil H to the main 29. The circuits and their connections with the motor have been illustrated diagrammatically. In ordinary practice the generator will be connected with the contacts 19 and 20 and contact buttons 21, 22 by some well known sort of device used for making electrical connection between movable parts.

I wish it to be understood that I do not desire to limit myself to the particular devices, constructions and arrangements herein shown and described, as obvious modifications will occur to those skilled in the art which will come within the scope of my invention. I have illustrated the invention as embodied in a reciprocating electric motor used as a stamp. The invention might be utilized in many other connections; the provision of a motor having two coils coupled together by connecting means having a shifting connection with the body of the machine would be of value in any apparatus of this sort where the strokes of the armatures were variable.

The use and operation of my apparatus is as follows: Suppose material to be placed in the battery of the stamp and the parts of the machine in the position shown in the drawing, current will pass from the generator over conductors 16 and 18, contact 20, contact button 22, conductor 31, through coil E, over conductor 32, through coil H, and, by conductors 33 and 29, back to the generator. Coils E and H will thus be simultaneously energized, E exerting an upward pull on core B and H a downward pull on core C, thus raising shoe 3 and driving shoe 4 down upon the material on die 2. It will be understood that cores B and C will be constructed, in the familiar manner, with the center parts only of magnetizable metal so that when the cores are in either upper or lower position they will be acted upon by the energization respectively of the lower and upper coils through which they pass. If core C does not complete its intended stroke because, for example, of some obstructions or unusual amount of material on the die below it, the shifting of the fulcrum of J will nevertheless permit core C to complete its up stroke. Thus the contact 19 will be brought against contact button 21 at the proper time. By this time, of course, the separation of contacts 20 and 22 will have shut off the current from E and H. The circuit from the generator may now be traced through G and F as follows: from the generator over conductors 16 and 17, contacts 19 and 21 and conductor 27 to coil G, from coil G by conductor 28 to coil F, from coil F by conductors 30, 29 back to the generator. The energization of G and F will, of course, cause the movement of the cores in respectively the opposite directions.

I claim:

1. The combination with a pair of electromagnets, of reciprocating armatures for such magnets, a lever connecting said armatures and having a shifting fulcrum.

2. The combination with a pair of solenoids, of cores for said solenoids, a lever, means for connecting said lever and said cores, and a shifting fulcrum for said lever.

3. The combination with a pair of solenoids, of cores, a lever, links connecting the ends of the lever and the cores, and a shifting fulcrum for said lever.

4. The combination with a pair of solenoids, of cores, tools carried by said cores, a lever, means for connecting the lever with the cores, and a shifting fulcrum for said lever.

5. The combination with a pair of solenoids, of cores, a lever, means for connecting the lever with the cores, and a pivoted device on which said lever is fulcrumed.

6. The combination with a pair of solenoids, of cores, a lever, means connecting the lever with the cores, a shifting fulcrum for said lever, and means actuated by the reciprocations of the cores for shifting the currents in the solenoids.

7. The combination with a pair of solenoids, of cores, a lever, means for connecting the lever with the cores, a shifting fulcrum for the lever, and means comprising devices upon said lever for shifting the currents in said solenoids.

8. The combination with a pair of solenoids, of cores, a lever, means for connecting the lever with the cores, a shifting fulcrum for the lever, and means for shifting the currents in the solenoids comprising a pair of elastically mounted contacts, and a pair of contacts on said lever.

9. The combination with a pair of cores, of upper and lower coils for each of said cores, a lever, means connecting the lever with the cores, a shifting fulcrum for the lever, the upper coil for each core being in circuit with the lower coil of the other core.

10. The combination with a reciprocating electric motor, of means for supporting the same comprising elastic supports, and means for pivoting the motor to said supports.

11. The combination with a reciprocating electric motor, of means for supporting the same comprising supports, sliding devices on said supports, springs upon which said sliding devices are supported, and adjusting means against which said springs abut.

12. The combination with a reciprocating electric motor, of means for supporting the same comprising supports, sliding devices on said supports, springs on which said sliding devices are mounted, adjustable devices against which the springs abut, and trunnions connecting the motor with the sliding devices.

13. The combination with two reciprocatably mounted armatures, of a lever connecting the same having a movable fulcrum and electro magnetic means for reciprocating said armatures.

14. The combination with a reciprocating electric motor of adjustable elastic supports for the same to which the motor is pivoted.

15. The combination with a reciprocating electric motor, of side supports for the same, movable devices on said supports, connecting means between the motor and the movable devices, springs supporting the movable devices and means for adjusting the position of the motor relative to the supports.

CHARLES W. TREMAIN.

Witnesses:
P. H. TRUMAN,
H. L. PECK.